US005816524A

United States Patent [19]

Opal

[11] Patent Number: 5,816,524

[45] Date of Patent: Oct. 6, 1998

[54] MAINSPRING DECOILER AND METHOD

[76] Inventor: David J. Opal, 437 Trumbull Hwy., Lebanon, Conn. 06249

[21] Appl. No.: 768,209

[22] Filed: Dec. 17, 1996

[51] Int. Cl.[6] .............................. B65H 75/40; B23Q 1/00

[52] U.S. Cl. .............................. 242/405.3; 242/578.2; 242/588.2; 81/487; 81/486; 269/50

[58] Field of Search .............................. 242/588.2, 405.3, 242/578.2, 129.6, 129.62; 81/487, 488, 486; 269/47, 49, 50, 51, 287; 29/225, 228

[56] References Cited

U.S. PATENT DOCUMENTS

| | | | |
|---|---|---|---|
| 974,417 | 11/1910 | Morgan | 242/405.3 |
| 1,423,516 | 7/1922 | Dieckmann | 242/405.3 |
| 2,268,178 | 12/1941 | Boisture | 242/405.3 |
| 2,908,132 | 10/1959 | Klemm | 242/588.2 |
| 3,816,896 | 6/1974 | Horsfall | 29/228 |
| 3,830,443 | 8/1974 | Quenot | 242/405.3 |
| 4,129,273 | 12/1978 | Hill | 242/405.3 |
| 5,516,059 | 5/1996 | Gudgeon et al. | 242/578 |
| 5,694,689 | 12/1997 | Filipowers | 29/228 |

*Primary Examiner*—John M. Jillions
*Attorney, Agent, or Firm*—Perman & Green, LLP

[57] ABSTRACT

A mainspring holder has a body portion to which is mounted a handle disposed at one end and a mount for rotatably holding a coiled spring thereon. The mainspring holder is capable of being moved relative to a support to unravel an otherwise coiled length of spring having its free end secured to the support so that the coil may be cleaned and greased while in its extended condition.

6 Claims, 4 Drawing Sheets

MAINSPRING DECOILER AND METHOD

BACKGROUND OF THE INVENTION

The present invention relates to a device for unwinding an otherwise coiled spring in a generally linear fashion to allow for cleaning and other maintenance necessary to the proper functioning of the mainspring in a clock, music box or other mechanical apparatus.

Mainsprings are found in numerous devices, for example, in clocks, music boxes and other mechanical apparatus which use a coiled spring to drive various mechanisms of the device. Periodically however, the mainspring must be cleaned and greased in order to keep the apparatus running properly. In order to do this, the coil spring must be unwound from an otherwise coiled condition. The unwinding of the coiled spring presents an unstable, and possibly hazardous situation if the unwinding process is not done with the benefit of an apparatus which controls the potential energy of an uncoiled length of spring. Still further, it is necessary to use a device which will allow cleaning and greasing of the spring without the need of assistance from people other than a single use operator.

Accordingly, it is an object of the present invention to provide a device which is capable of unwinding a coil spring of the type typically found in clocks, music boxes and or other mechanical apparatus in such a way as to allow the uncoiled length of spring to be readily cleaned and greased by a user while controlling the uncoiled length of the mainspring during the cleaning process.

It is still a further object of the invention to provide an apparatus of the aforementioned type where the device is compact in size and is readily easily usable by a single user to effect cleaning and greasing of a mainspring in its decoiled state.

Still a further object of the invention is to provide a light weight compact device of the aforementioned type which is capable of adapting to variously sized mainsprings having different widths.

Still a further object of the invention is to provide a device of the aforementioned type which is lightweight and easy to use.

Still a further object of the invention is to provide a device of the aforementioned type which is usable with a variety of mainsprings configured with varying diameters.

SUMMARY OF THE INVENTION

The invention resides in a work holding device onto which is mounted a coiled mainspring which remains mounted thereon in a substantially coiled condition so that a length of the spring otherwise existing in a coiled condition can be unraveled in order to effect cleaning and or greasing of the unraveled length.

The work holder comprises a body portion extending along a central axis and having a first end and a second end. A handle is connected to the body portion at the first end thereof and a mounting means is connected to the body portion and is associated with the body portion at the second end thereof. Mounting means is connected to the body portion and provides a means for rotatably mounting a mainspring thereon. The mounting means includes at least one wall member which together with the body portion defines a space for holding a mainspring for unwinding.

Preferably, the mounting means includes two wall members defining a bifurcated shape and the two wall members are defined by side plates removable from the body portion and the body portion includes oppositely extending threaded members extending outwardly from the body portion and oppositely extending transverse pins disposed remotely from the oppositely extending threaded members along the central axis.

Ideally, the body portion along each lateral is flat and faces respectively flat lateral sides of the side plates. The side plates each have a plurality of openings corresponding respectively to the location of one of the threaded members and the transverse pins and a plurality of spacers journalled on the threaded members and interposed between the flat lateral sides of the body portion and each of the side plates.

Preferably, the handle has a Y-shape as defined by a shank and a connected yoke, the shank being the body portion and the first and second side plates have free ends with aligned openings therein and the aligned openings are sized to receive a mounting shank extending transversely thereacross.

The invention further resides in a method of cleaning a coiled mainspring having a coiled inner end and an outwardly disposed free end. The method comprises the steps of providing a holder on which is mounted a handle. The invention includes providing a mounting means connected to the body portion and providing a means for rotatably mounting a mainspring thereon, and providing the mounting means with at least one wall member which together with the body portion defines a space for holding a mainspring for unwinding. The method further resides in fixing the free end of the coiled mainspring to a support and rotatably mounting the coiled mainspring on the mounting means of the holder and then moving the holder away from the support so as to uncoil the otherwise coiled length of the coil spring while being supported on the holder.

The method further resides in the step of mounting the coiled mainspring to the holder including the step of providing parallel spaced side plates which are removably attached to the holder and rotatably mounting the coiled mainspring to the holder using a transverse mounting shank supported by the side plates.

DETAILED DESCRIPTION OF THE PREFERRED EMBODIMENTS

Figure 1:
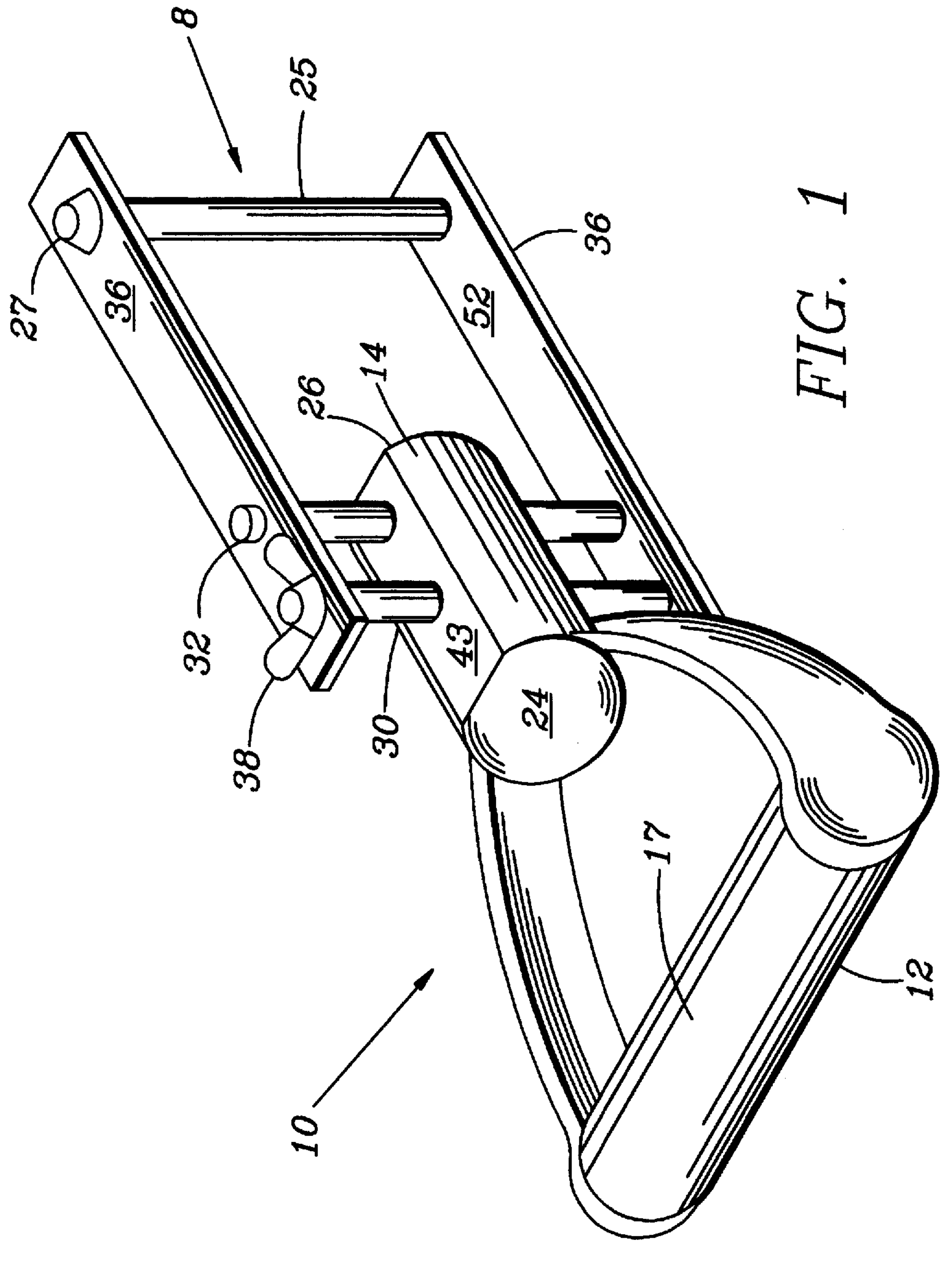
FIG. 1 is a perspective view the mainspring decoiler holder of the present invention shown absent a mounted coiled mainspring.

Referring now to the figures, and in particular to FIG. 1, a mainspring decoiler holder embodying the invention is shown generally at 10. The holder includes a handle 12 which is capable of being readily gripped by a user, and a body portion 14 having a means 8 for mounting a spiral bound mainspring illustrated generally at 16. Both the handle 12 and the body portion 14 extend coextensively along a common central axis AX. The mainspring 16 has a free end 18 which, during the use of the present invention, is secured to a fixed support, such as a vice or other suitable clamping means, such as a fixed headed stud which is received within an opening in the free end 18 of the spring, for the purpose of providing a stationary or anchor position away from which the remainder of the coil spring is moved to cause unwinding of the mainspring 16.

Figure 2:
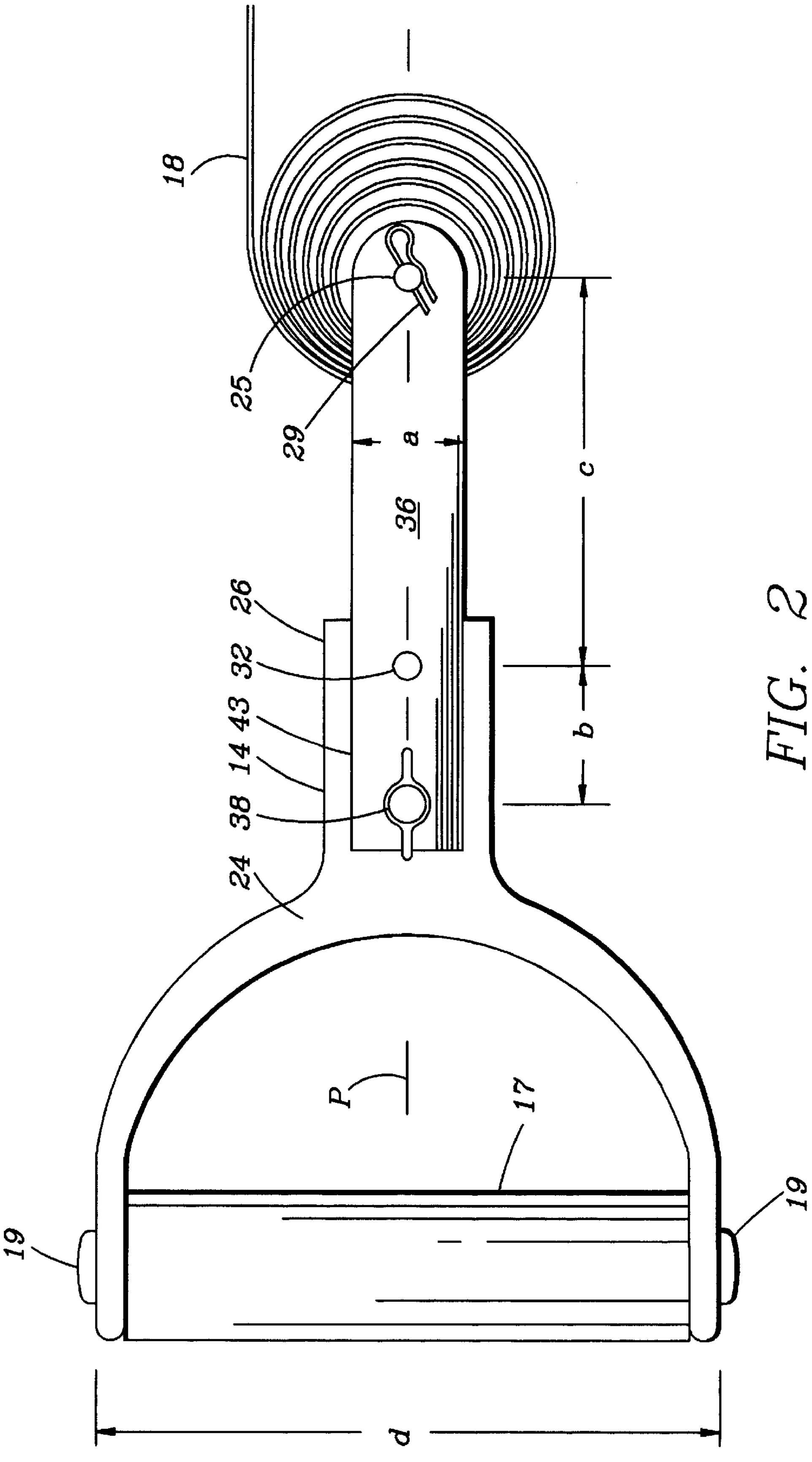
FIG. 2 is a side elevation view of the holder in FIG. 1 shown with an exemplary mainspring mounted thereto.
Figure 3:
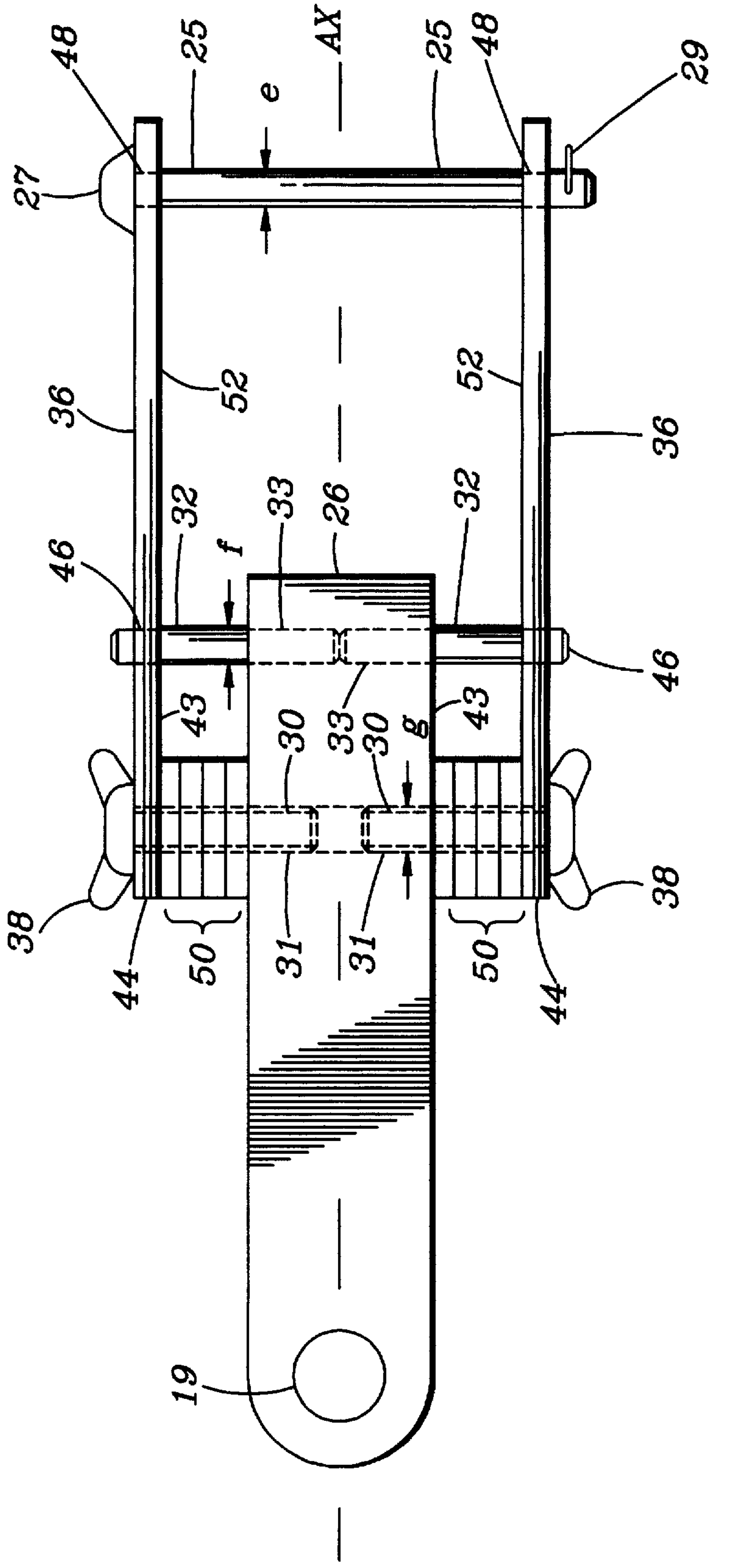
FIG. 3 is a top plan view of the mainspring decoiler of FIG. 2.
Figure 4:
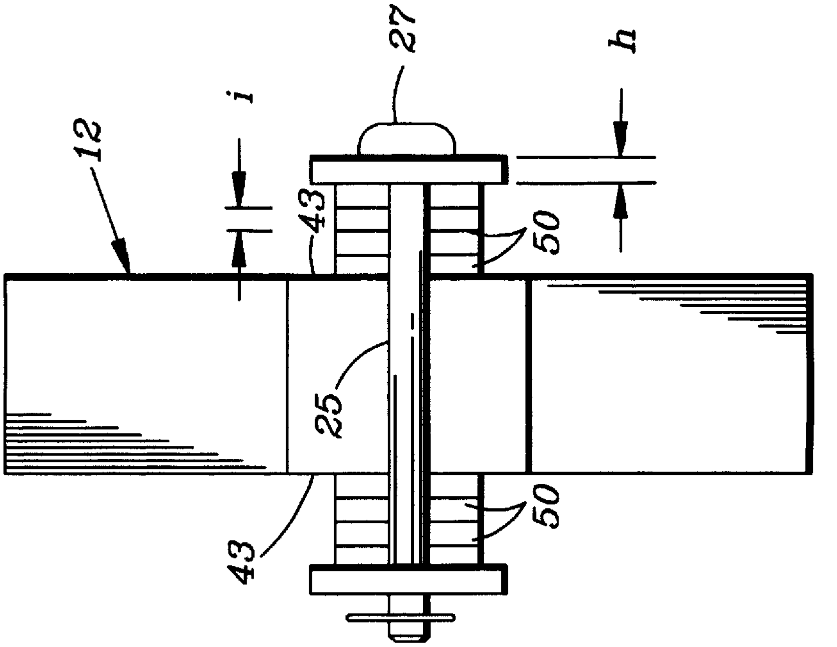
FIG. 4 is a front elevation view of the mainspring holder of FIG. 3.

Referring now to FIGS. 2–4, and more particularly to the specific construction of the holder 10, it should be seen that the body portion 14 is a generally elongated piece having a first end 24 associated with the handle 12 and a second end 26 associated with the mounting means 8 of the body portion for rotatably supporting the mainspring 16 thereon. In the illustrated embodiment, the handle and the body portion are integrally formed with one another such that the intersection between the handle 12 and the body portion 14 makes a general bifurcated Y-shaped configuration. The bifurcated open end of the Y-shaped configured handle member is bridged by a holding bar 17 which is mounted to the bifurcated parts by screws 19,19.

Also associated with the first end 24 of the body portion 14 is a pair of oppositely extending threaded members 30,30 which are anchored into the body portion 14 within transversely extending threaded openings 31,31 which extend perpendicularly to the central axis AX. Disposed adjacent the opposite second end 26 of the body portion are a set of transversely extending locating pins 32, 32 which extend outwardly from the body portion 14 and are positioned within a common plane P with the threaded members 30,30. Each of the pins 32,32 is received within a corresponding receiving opening 33,33 formed in the body portion 14 and is secured against movement therewithin by either an interference fit or through an adhesive bond.

A pair of side plates 36,36 are also provided as part of the holder, and each includes three openings 44,46 and 48 each disposed within a common plane P. A first opening 44 is provided at one end of each plate and is of a diameter sufficient to receive the associated one of the threaded members 30,30 therewithin. Each side plate 36,36 further includes a second opening 46 which is correspondingly spaced from the first opening 44 so as to receive in a journalling relationship therewithin an associated one of the transverse pins 32. A third opening 48 is also provided at the opposite end of each plate, and is spaced from the second opening 46 by the dimension c so as to provide an opening which receives the mounting shank 25 slidably transversely therethrough when the holder 10 is in the assembled condition.

The mounting shank 25 has at one end, a T-shaped head 27 which prevents it from passing inwardly through the juxtaposed opening 48 in the associated side plate 36, and has at its opposite end a locking pin 29 extending transversely through an opening in the shank 25 to secure the shank against lateral movement relative to the plates 36,36 when the shank is located within the third openings 48,48. Thus, each of the side plates 36, 36 has an opening respectively located in positions thereon corresponding respectively to the location of the threaded members 30,30 and each of the locating pins 32,32.

Each side plate 36,36 is a flat member and seats flushly on the body portion 14 respectively on flat side faces 43,43 disposed along the lateral sides of the body portion 14 which extend parallel to the central axis AX. Each side plate is secured in place on the respective ones of the threaded members 30,30 through the intermediary of wing nuts 38,38 which clamp the plates 36,36 in a parallel relationship to one another and to the flat side faces 43,43 of the body portion 14.

It is a feature of the invention to use the side plates 36,36 to provide a space to accommodate mainsprings of different widths in the mounting means 8 of the holder. For this purpose, a plurality of spacers 50,50 are provided and each is provided for disposition about one of the threaded members 30,30, respectively. It is noted that the second end of the body portion at the transversely extending pins 32,32 is not provided with any such spacers, but rather is left somewhat laterally deflectable. This is because the number of spacers selected for mounting on each of the threaded members 30,30 is preferably optimally selected so that the inner surfaces 52,52 of each of the side plates 36,36 preferably somewhat bears upon the side edges of the mainspring 16 which is mounted about the transversely extending mounting shank 25.

By way of example, the mainspring decoiler holder embodying the invention shown in the drawings in the preferred embodiment has the following dimensions with respect to the dimension labels appearing in the drawings:

| Reference | Dimension |
|---|---|
| a | ¾" |
| b | 15/16" |
| c | 3 9/16" |
| d | 4 3/16" |
| e | 3/16" |
| f | 3/16" |
| g | ¼" |
| h | 3/16" |
| i | ⅛" |

In use, the coil spring is mounted onto the transversely extending mounting shank 25 by sliding the shank laterally through the opening in the core of the mainspring. An appropriate number of spacers 50 are selected and mounted to the threaded members 30, 30 to capture the width of the spring in the manner discussed above. The transversely extending mounting shank 25 is the secured against movement by the locking pin 29 within the side plates 36,36. In this condition as shown in FIG. 2, the mounting shank 25 and the threaded members 30, 30 capture the width of the spring in the manner discussed above. The transversely extending mounting shank 25 is the secured against movement by the locking pin 29 within the side plates 36,36. In this condition as shown in FIG. 2, the mounting shank 25 extends through the center of the spiral pattern of the spring so as to allow for relative rotation between the shank 25 and the coil of the spring as the holder is moved away from the secured free end 18 of the spring. Thus, the coil spring remains substantially wound upon the transverse mounting shank 25 during the decoiling process in that all but the last one and half or so turns of the spring may be unwound to provide the connection between the holder and spring. As such, with the free end of the spring secured against movement to the support, and the user walking away with the holder to pay out the otherwise unraveled length of the coiled spring, the user's other remaining hand can be used to clean the unraveled length of spring and to then grease it as the user walks away with the coil using the holder.

By the foregoing, a mainspring decoiler has been described by way of the preferred embodiment. However, numerous modifications and substitutions may be had without departing from the spirit of the invention. For example, it is well within the purview of the invention to use a mainspring which is mounted to a core, and to mount the core directly to the transverse shank and use the holder in a manner which is described in the preferred embodiment.

Accordingly, the invention has been described by way of illustration rather than limitation.

What is claimed is:

1. A work holder comprising:

a body portion extending along a central axis having a first end and a second end;

a handle connected to the body portion at said first end thereof;

a mounting means connected to the body portion and associated with the body portion at said second end thereof; and said mounting means providing a means for rotatably mounting a mainspring thereon, said mounting means including at least one wall member which together with said body portion defines a space for holding a mainspring for unwinding;

said mounting means includes two wall members defining a bifurcated shape, and wherein said two wall members being defined by two side plates removable from said body portion and said body portion includes oppositely extending threaded members extending outwardly from said body portion and oppositely extending transverse pins disposed remotely from said oppositely extending threaded members along said central axis.

2. A holder as defined in claim 1 further characterized by said body portion along each lateral side in which said threaded members and said transverse pins extend having flat sides facing respectively flat lateral sides of said side plates.

3. A holder as defined in claim 2 further characterized by said side plates each having a plurality of openings corresponding respectively to the location of one of said threaded members and said transverse pins and a plurality of spacers journalled on said threaded members and interposed between said flat lateral sides of said body portion and each of said side plates.

4. A holder as defined in claim 3 further characterized by said handle has a Y-shape as defined by a shank and a connected yoke, said shank being defined by said body portion.

5. A holder as defined in claim 4 further characterized by said first and second side plates having free ends with aligned openings therein; and wherein said aligned openings are sized to receive a mounting shank extending transversely across said bifurcated space.

6. A holder as defined in claim 3 further characterized by said first and second side plates having free ends with aligned openings therein; and wherein said aligned openings are sized to receive a mounting shank extending transversely across said bifurcated space.

* * * * *